United States Patent [19]
Sumiejski et al.

[11] Patent Number: 5,750,477
[45] Date of Patent: May 12, 1998

[54] LUBRICANT COMPOSITIONS TO REDUCE NOISE IN A PUSH BELT CONTINUOUS VARIABLE TRANSMISSION

[75] Inventors: James L. Sumiejski, Mentor, Ohio; Roy Fewkes, Derbyshire, United Kingdom; Craig Daniel Tipton, Perry, Ohio

[73] Assignee: The Lubrizol Corporation, Wickliffe, Ohio

[21] Appl. No.: 500,810

[22] Filed: Jul. 10, 1995

[51] Int. Cl.$^6$ .................... C10M 135/02; C10M 143/00
[52] U.S. Cl. .................... 508/331; 508/391; 585/10
[58] Field of Search .................. 252/18, 25, 32.7 E, 252/45, 48.6, 51.5 R, 49.8; 585/12, 10; 508/391, 460, 331

[56] References Cited

U.S. PATENT DOCUMENTS

| | | |
|---|---|---|
| 3,652,410 | 3/1972 | Hollinghurst et al. . |
| 4,031,020 | 6/1977 | Sugiura et al. . |
| 4,299,714 | 11/1981 | Sugiura et al. . |
| 5,284,591 | 2/1994 | Bayles et al. .................... 508/185 |
| 5,364,994 | 11/1994 | Schart .................... 585/3 |
| 5,387,346 | 2/1995 | Hartley et al. . |
| 5,449,470 | 9/1995 | Cahoon et al. .................... 508/460 |

OTHER PUBLICATIONS

Viscosity Shear Stability of Transmission Lubricants (Taper Roller Bearing Rig), CEC Co–Ordinating European Council, CEL L–45–T–93 Date Unknown.

"Lubricant as a Construction Element in the VDT Push–Belt CVT System", SAE Technical Paper Series 932848, Fuels and Lubricants Meeting and Exposition, Philadelphia, Pennsylvania, Oct. 18–21, 1993, pp. 1–7.

*Primary Examiner*—Jacqueline V. Howard
*Assistant Examiner*—Cephia D. Toomer
*Attorney, Agent, or Firm*—William J. Connors

[57] ABSTRACT

A shear stable composition for reducing noise in a push belt continuously variable transmission. The composition comprises an oil of lubricating viscosity, an overbased metal salt of an organic acid and a shear stable viscosity index improver.

61 Claims, 4 Drawing Sheets

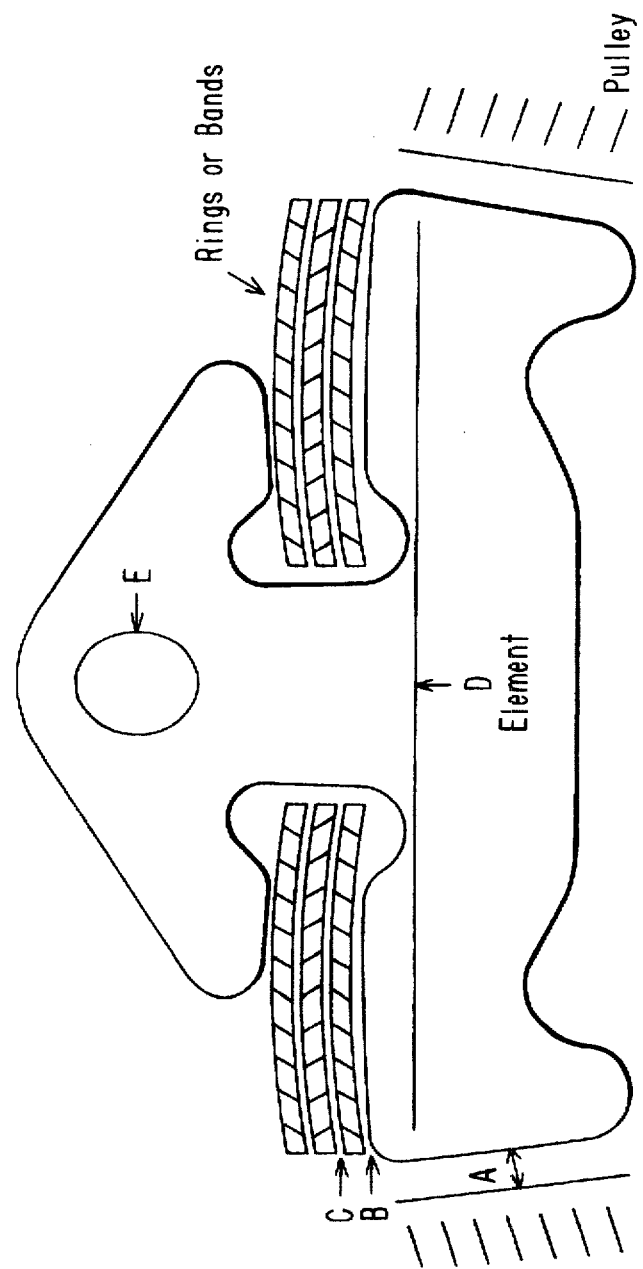

LUBRICANT COMPOSITIONS TO REDUCE NOISE IN A PUSH BELT CONTINUOUS VARIABLE TRANSMISSION

BACKGROUND OF THE INVENTION

1. Field of Invention

This invention relates to lubricating and functional fluid compositions. The composition is particularly suited for continuous variable transmissions.

For a recent review and discussion of lubricant/CVT relationships see *Lubricants as a Construction Element in the VDT Push-Belt CVT System*, by Fewkes et al. SAE Technical Paper Series No. 932848 Fuels and Lubricants Meeting, Philadelphia, Oct. 18–21, 1993; SAE International, 400 Commonwealth Drive, Warrendale, PA 15096-0001, U.S.A. Tel. (412) 776-4841. This document is incorporated herein by reference in its entirety.

2. Description of the Art

The Continuous Variable Transmissions (CVT) represents a radical departure from conventional automatic transmissions. The push belt version of the CVT was invented by Dr. Hub Van Doorne. The first vehicles incorporating the push belt CVT were introduced in 1987, and since then 750,000 cars have been equipped with the push belt CVT system. CVT's are manufactured by Van Doorne's Transmissie BV of Tilburg, The Netherlands.

It has become clear from commercial use of the CVT that the fluid used in the CVT was just as important as mechanical design for satisfactory operation of the CVT. A crucial aspect of the CVT is the relationship between the steel-on-steel contacts between the belt and pully assembly.

FIGS. 1–4 show the crucial parts of the push belt CVT and throttle Angles/Engine Speed Relations as controlled by the CVT.

CVT Belt Operation

FIG. 1 shows the belt and pulley system for the Van Doorne Transmissie push-belt CVT. FIG. 2 shows the belt, which consists of a set of metal elements connected by metal bands.

Each V-shaped pulley consists of a moveable sheave, a hydraulic cylinder, and fixed sheave. To maintain good belt alignment, the fixed sheaves are on opposite sides of the belt. Hydraulic pressure to the cylinders places an inward force on the belt, which controls belt traction and places the assembly under a preload. In operation, the driving pulley pushes the belt to the driven pulley to transfer power from the input to output. In effect, the belt elements are pumped from the driving to driven pulley, with the steel bands acting as preloading and guiding elements, FIG. 3.

The transmission drive ratio is controlled by opening or closing the moveable sheaves so that the belt rides lower or higher on the pulley faces. This manner of operation permits infinite adjustment of gear ratio between the input and output shafts.

Benefits of a CVT

Besides the infinite ratio adjustment, the push-belt CVT also provides a wide ratio span, making high overdrive possible. Other advantages include:

Ability to optimize engine mapping relative to fuel economy and emission level.

Substantial fuel consumption reductions are possible compared to conventional automatic transmissions; for example, a 17% reduction in a 3.3-liter Chrysler Voyager in ECE-Cycle compared to a four-speed automatic.

Driving comfort—no perceptible ratio change due to the absence of stepped gears.

Low noise operation because the engine always operates at the lowest speed required and because the belt elements have a small pitch (compared to chain drive systems).

Function of a CVT Lubricant

In a push-belt CVT, the lubricant must fulfill several functions:

Lubricate the metal belt, planetary and other gears, wet-plate clutches, and bearings.

Cool the transmission.

Carry hydraulic signals and power—hydraulic pressure controls belt traction, transmission ratio, and clutch engagement.

Tribological Aspects of the Belt System

FIG. 4 shows a cross section of the belt system and its contacts, and Table 1 characterizes the contacts in terms of their tribologic properties. Tangential slip is difficult to measure. The change in output speed is a combination of ratio change and actual slip. However, under load, only the ratio change can be measured with any accuracy. Therefore, sliding speed between the belt elements and pulley listed in table 1 has been estimated. Also, the range of sliding speeds listed for the ring/element and element/element contacts is caused by the different radii at which the belt rides on the driving pulley.

Table 2 lists the possible slip or wear-related lubricant problems that could arise at the various contacts. It should be noted that these problems were observed only in early tests with experimental fluids. Currently used fluids to no exhibit these problems. In addition, the belt has been developed to maximize its reliability; for instance, the turnover line radius has been increased to reduce contact stress.

TABLE 1

Velocities and Pressures in Belt Contacts

| Contact | Name | Pressure (bar) | Velocity (m/s) |
|---|---|---|---|
| A | Pulley/element | 100–1000 | Unmeasureable (tangential and actual slip) |
| B | Element/ring | 20–100 | 0.05–0.5 (sliding) |
| C | Ring/ring | 20–100 | 0.01–0.10 (sliding) |
| D | Element/element | 0–10,000 | 1–10 (rolling) |
| E | Element/element | Unmeasurable | 1–10 (rolling) |

TABLE 2

Possible Wear-Related Lubricant Problems

| Contact | Name | Potential Problem |
|---|---|---|
| A | Pully/element | Polishing, slip, grey flaking |
| B | Element/ring | Wear |
| C | Ring/ring | Black spots |

TABLE 2-continued

| Possible Wear-Related Lubricant Problems | | |
|---|---|---|
| Contact | Name | Potential Problem |
| D | Element/element | Pitting, scratches |
| E | Element/element (pin) | Scuffing, scratches |

In operation, CVT's have demonstrated a noise which is commonly referred the "scratch phenomenon" which manifests itself as a transfer gear rattle under slow speed, light load conditions. Experiments have revealed that the noise could be eliminated by the fluids of this invention.

Simple screening tests as described in details in SAE Paper Series No. 932848 were then used to determine which fluids were specifically suited to eliminate the scratch phenomenon under all CVT driving conditions and which would also provide superior wear protection under severe conditions.

It was determined from later tests that the scratch phenomenon was related to the frictional characteristics of the CVT belt assembly, and was caused by stick slip within the belt mechanism. It was found that when CVTs were tested with commercially available automatic transmission fluids that none would eliminate the CVT noise problem.

SUMMARY OF THE INVENTION

The present invention describes an additive package which when added to an oil of lubricating viscosity forms a lubricating functional fluid composition which when employed in a push belt CVT eliminates noise or "scratch phenomena" in the CVT. The additive package comprises:

(a) 15–55% overbased detergent
(b) 5–30% metal dialkyl dithiophosphate
(c) 5–30% sulfur containing friction modifiers
(d) 5–30% dialky phosphites
(e) 0.5–10% fatty amides
(f) 1–25% viscosity modifier where weight percent is equal to the weight of each component based on the total weight of the additive package and are given on an oil free basis.

A composition similar in some respects to the present invention is included in U.S. Pat. No. 3,652,410 to Hollinghurst, et al which is incorporated herein by reference. The functional/lubricating fluid of the present invention has a requirement that the −40° C. Brookfield viscosity be less than 20,000 cP. It is also required that the fluid be shear stable so that the viscosity of the fluid remains largely unchanged. Shear stability of functional/lubricating fluids were determined by conducting a Tapered Bearing Shear Test for 20 hours, then measuring the 100° C. viscosity at the end of the test. A preferred range for viscosity loss of the fluid as a result of the test is up to 5%.

The Tapered Bearing Shear Test is a published standard test entitled "Viscosity Shear Stability of Transmission Lubricants" and is described in CEC L-45-T-93 available from CEC, 61 New Cavendish Street, London WIM 8AR, England. The same test is also published as DIN 51 350, part 6 and is available from deutsches Institute für Normung, Burggrafenshase 6, 1000 Berlin 30, Germany. Both references are incorporated herein by reference.

Shear tests were run using the additive package of the present invention with polybutene and Rohm and Haas Acryloid 1263 viscosity modifiers (VM). Fluids identical but for VM's were tested after having been made up to roughly the same initial kinematic viscosity of 7–7.5 cSt at 100° C. After 20 hours of the Tapered Bearing Shear Test the end of test viscosity of the acrylate containing sample had dropped 32% as compared to 2% for the polybutene VM. The $\overline{Mn}$ of the polybutene was in the range of about 2000 and the $\overline{Mn}$ of the Acryloid about 70,000. The oil of lubricating viscosity for both fluids was synthetic and a mixture of PAO and a diester. Both are commercially available from Gulf or Ethyl, and Henkle-Emery respectively. The synthetic oils have a viscosity of 3–5 cSt but may range from roughly 1–8 cSt.

Reference disclosing a friction modifier in a base oil having a Brookfield viscosity of below 20,000 cP at −40° C. are U.S. Pat. Nos. 5,387,346; 4,299,714 and 4,031,020. The '346 patent reveals a composition with up to 35 weight % of a poly-alpha-olefins and a VM which comprises less than 7.0% by weight of the composition. The only information in the patent specification on VM's gives a list of known VM's. However, in the file wrapper an enabling VM disclosure is made in the form of a declaration by the inventors in which Acryloid 1263, a polymethacrylate from Rohm and Haas is used in the several automatic transmission fluid compositions cited. Acryloid 1263 has a $\overline{Mn}$ of about 70,000 and $\overline{Mw}$ of about 270,000. FZG Standard Shear tests on compositions having 6.9 and 4.15 weight percent of the Acryloid 1263 resulted in the shear drops of 32.4% and 23.7% respectively as determined by viscosity drops as measured at 100° C. The FZG shear test is available as CEC-L-37-T-85 from CEC at 61 New Cavendish Street, London WIM 8R, England.

U.S. Pat. No. 4,299,714 recites a composition having up to 47.5% by weight poly-alpha-olefin and a polymethacrylate with viscosity average molecular weight of 10,000–70,000. The compositions of this '714 patent were formulated to meet SAE 71R1 and 71R2 standards. Examples of the '714 give formulations in which the base oil is 100% synthetic. The VM used in all examples is a polymethacrylate with 143,000 viscosity average molecular weight and is included in composition examples in the range of about 12–18% by weight of the compositions.

U.S. Pat. No. 4,031,020 reveals a base oil, VM composition in which the base may comprise up to 100% by weight synthetic oil.. The viscosity index improver is 5–30% by weight of the composition. The VM's as described are polymethacrylates of 50,000–200,000 average molecular weight. Average molecular weight is not defined as being number average, weight average or viscosity average. The viscosity index improver used in the examples of the '020 patent are polymethacrylates of average molecular weight of 143,000.

DETAILED DESCRIPTION OF THE INVENTION

Figure 1:
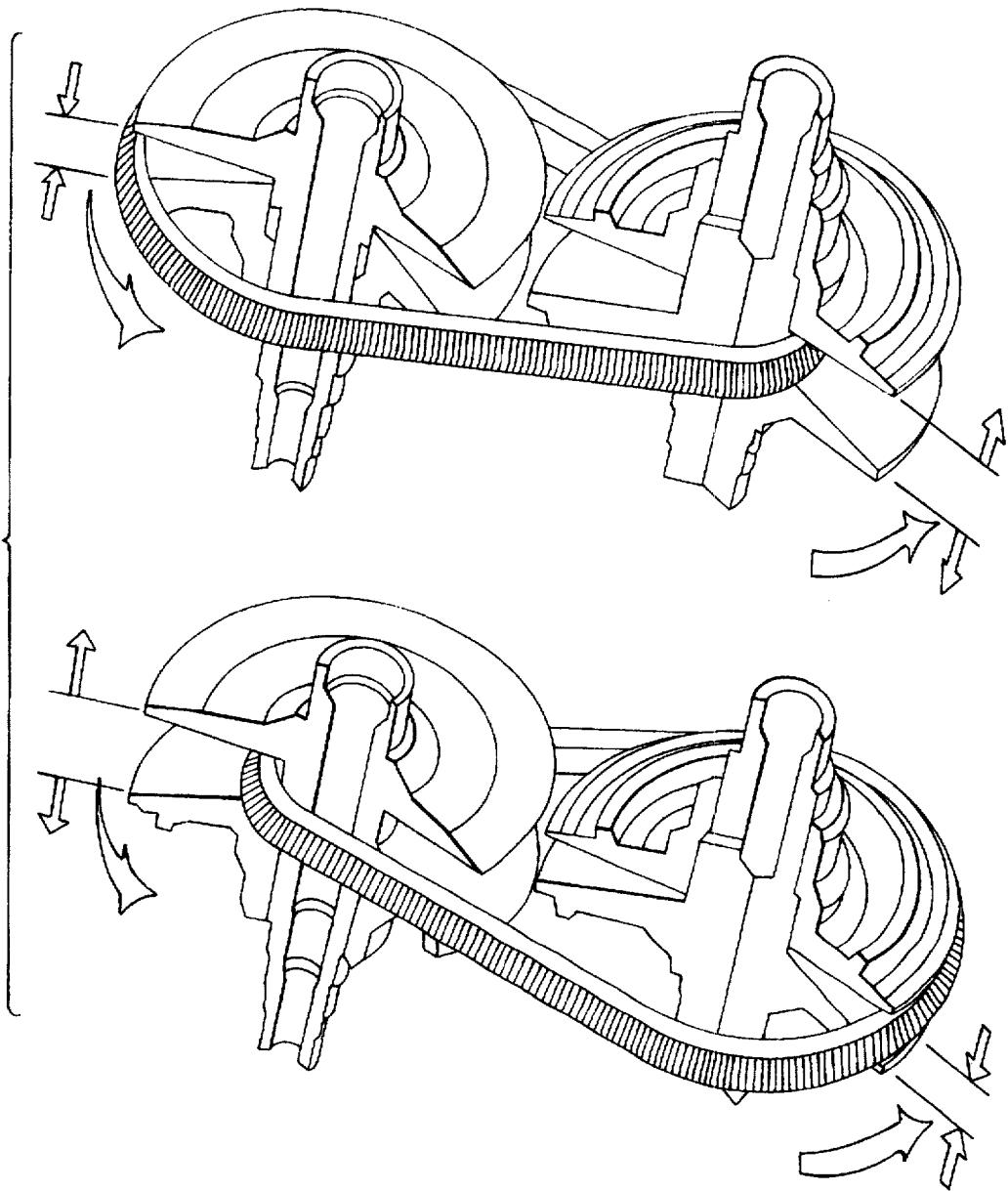
Figure 2:
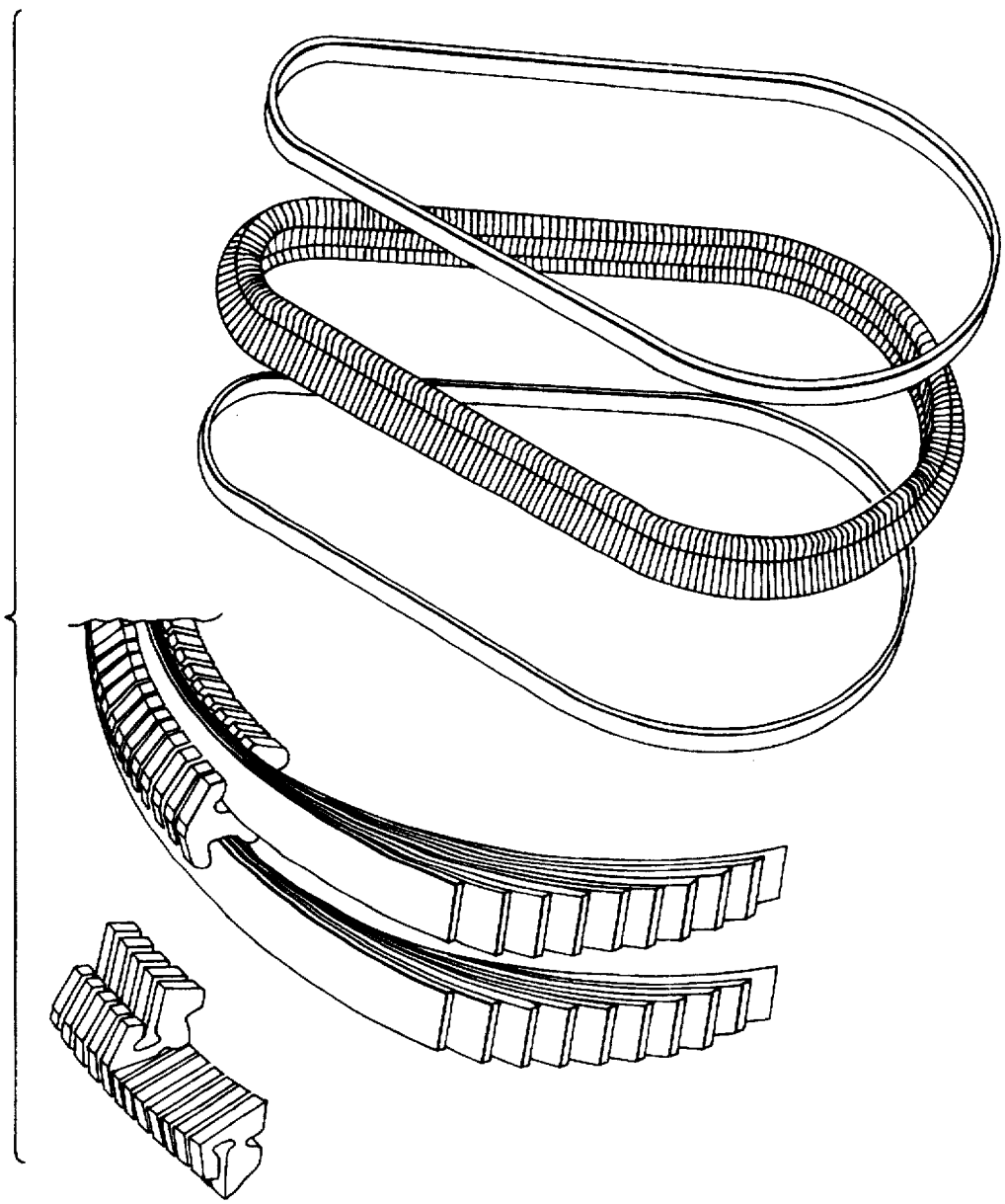
Figure 3:
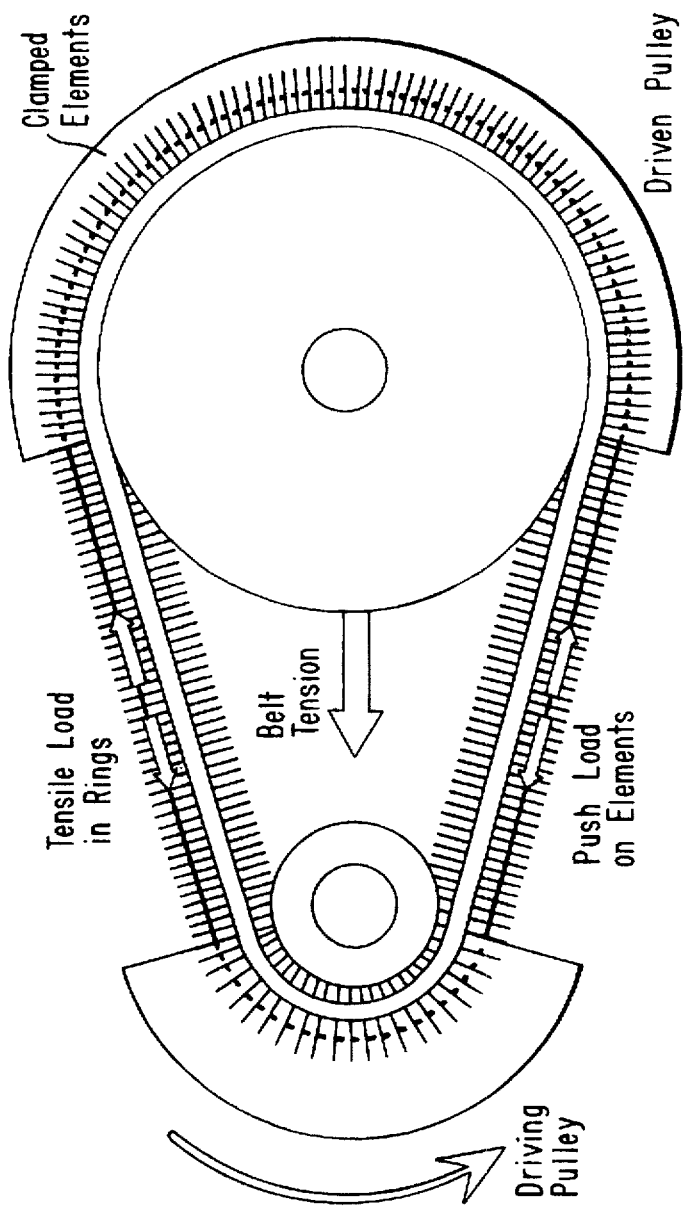

In use the additive package is added to a base oil of lubricating viscosity to form a lubricating/functional CVT fluid. Also added to the lubricating base oil composition is a viscosity index improver. Thus the CVT fluid of the invention has a content of components in weight percent based upon the total weight of the fluid. The fluid comprises:

(a) 50–95% base oil of lubricating viscosity;
(b) 3–20% additive package described above; and
(c) up to 50% viscosity index improver.

The base oil used in the CVT fluid may be natural, mineral, synthetic or mixture thereof. Natural oils include animal and vegetable oils. Mineral lubricating oils include liquid petroleum oils and solvent or acid treated mineral lubricating oils of the paraffin, napthenic or mixed paraffinic-napthalenic types. Oils of lubricating viscosity derived from coal or shale are also useful.

Synthetic lubricating oils include hydrocarbon oils and halo substituted hydrocarbon oils such as polymerized and interpolymerized olefins, etc., and mixtures thereof, alkybenzenes, polyphenyls (e.g., biphenyls, terphenyls, alkylated polyphenyls, etc.), alkylated diphenyl ethers and ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, sebacic acid, etc.) with a variety of alcohols (e.g., butyl alcohol, dodecyl alcohol, ethylene glycol, diethylen glycol monoether, etc.)

Esters useful as synthetic oils also include those made from $C_5$ to $C_{12}$ monocarboxylic acids and polytols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants. Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the compositions of the present invention. Unrefined oils are those obtained directly from a nature or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, hydrorefining, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed and oil breakdown products.

Specific examples of the above-described oils of lubricating viscosity are given in U.S. Pat. No. 4,326,972 and European Pat. No. Publication 107,282, both of which are hereby incorporated by reference for relevant disclosures contained therein.

The functional/lubricating fluid compositions of this invention include, together with CVT fluids, engine oils and power transmission fluids, including hydraulic fluids, power shift transmission fluids and automatic transmission fluids. the specific types and characteristics of oils of lubricating viscosity for the various applications are well known in the art.

The preferred base oils for CVT fluids are 4cSt hydrogenated poly-alpha-olefins available from Ethyl as Ethyl Flo 164 and a 3 cSt diester available from Emery as Emolein 2958 and mixtures thereof. The base oils for the invention may have a viscosity range of 1–11 cSt at 100° C.

The detergent component of the additive mixture may be borated or nonborated overbased alkali metal or alkaline earth metal salt of a sulphonate, phenate, salicylate, carbonate, phosphorus containing acids and mixtures thereof.

The sulfonate salts are those having a substantially oleophilic character and which are formed from organic materials. Organic sulfonates are well known materials in the lubricant and detergent arts. The sulfonate compound should contain on average from about 10 to about 40 carbon atoms, preferably from about 12 to about 36 carbon atoms and preferably from about 14 to about 32 carbon atoms on average. Similarly, the phenates, oxylates and carboxylates have a substantially olephilic character.

While the present invention allows for the carbon atoms to be either aromatic or in a paraffinic configuration, it is highly preferred that alkylated aromatics be employed. While naphthalene based materials may be employed, the aromatic of choice is the benzene moiety.

The most preferred composition is thus a monosulfonated alkylated benzene, and is preferably the monoalkylated benzene. Typically, alkyl benzene fractions are obtained from still bottom sources and are mono-or di-alkylated. It is believed, in present invention, that the mono-alkylated aromatics are superior to the dialkylated aromatics in overall properties.

It is desired that a mixture of mono-alkylated aromatics (benzene) be utilized to obtain the mono-alkylated salt (benzene sulfonate) in the present invention. The mixtures wherein a substantial portion of the composition contains polymers of propylene as the source of the alkyl groups assists in the solubility of the salt in the manual transmission fluid. The use of mono-functional (e.g., mono-sulfonated) materials avoids crosslinking of the molecules with less precipitation of the salt from the lubricant.

It is also desired that the salt be "overbased". By overbasing, it is meant that a stoichiometric excess of the metal be present over that required to neutralize the anion of the salt. The excess metal from overbasing has the effect of neutralizing acids which may build up in the lubricant. A second advantage is that the overbased salt increases the dynamic coefficient of friction. The overbasing is generally done such that the metal ratio is from about 1.05:1, preferably 2:1 to about 30:1 and most preferably from about 4:1 to about 25:1. The metal ratio is that ratio of metallic ions on an equivalent basis to the anionic portion of the overbased material.

Alkali metal borate dispersion may be prepared by the following steps: a suitable reaction vessel is charged with the alkali metal carbonate overbased metal sulfonate within the oleophilic reaction medium (typically the hydrocarbon medium employed to prepare the overbased metal sulfonate). The boric acid is then charged to the reaction vessel and the contents vigorously agitated.

The reaction is conducted for a period of 0.5 to 7 hours, usually from 1 to 3 hours at a reaction temperature of 20° to 200° C., preferably from 20° to 150° C. and more preferably from 40° to 125° C. At the end of the reaction period, the temperature is raised to 100° to 250° C. preferably from 100° to 150° C. to strip the medium of any residual alcohol and water. The stripping may be done at atmosphere pressure under reduced pressure of 93 KPa to 1 KPa Hg.

The amount of boric acid charged to the reaction medium depends upon what type of alkali metal borate is desired. If a tetraborate is desired 2 molar parts of boric acid are charged per molar equivalent of overbased alkali metal (e.g., 4 molar parts of boric acid for each molar part of sodium carbonate). Generally, from 1 to 3 molar parts of boric acid are charged to the reaction medium for each equivalent part of overbased alkali metal. The overbased alkali metal refers to the metal in excess of that needed to neutralize the sulfonate anion.

The amount of alkali metal borate which may be present in the oleophilic lubricating oil may vary from 0.1 to 65 weight percent depending on whether a concentrate or final lubricant is desired. Generally, for concentrates, the borate content varies from 20 to 50 weight percent, and preferably from 35 to 45 weight percent. For lubricants, the amount of borate generally varies from 0.1 to 20 weight percent and preferably from 4 to 15 weight percent.

The borate dispersions are conveniently sodium or potassium metaborates, having from 0 to 8 waters of hydration (preferably 1 to 5) and prepared from an overbased sodium, potassium, calcium or barium petroleum sulfonate. Particularly preferred is a borate dispersion of sodium metaborate having 0 to 2 waters of hydration and prepared from an overbased calcium sulfonate.

The alkali metal tetraborates are prepared form an overbased metal sulfonate and converted into a metaborate by the subsequent reaction with two molar parts of an alkali metal hydroxide per molar part of said alkali metal tetraborate. This is the preferred method for preparing the metaborates since a charge ratio of one molar part of boric acid per molar part of metal carbonate in the overbased sulfonate tends to form a mixture predominantly a metal tetraborate and overbased metal carbonate. The reaction conditions may be the same as that described for the preparation of the alkali metal carbonate overbased alkali or alkaline earth metal sulfonate.

A preferred boronated product useful herein may be obtained from a process for obtaining a high carbonate content borated product comprising:

(a) mixing an overbased sulfonate and any required inert liquid medium, (b) borating the mixture (a) with a borating agent at a temperature less than that at which substantial foaming occurs, (c) raising the temperature of the mixture (b) to that temperature in excess of the boiling point of water within the mixture (b), (d) separating substantially all of the water from the reaction mixture (c) while retaining substantially all of the carbonate in the mixture (c) and, (e) recovering the product (d) as a high carbonate content borated product.

A process for obtaining a high carbonate content overbased borated product containing at least about 5% by weight of carbon dioxide wherein the product is obtained by:

(a) mixing an overbased component and any required inert liquid medium, (b) reacting component (a) in the presence of a borating agent to a boron content of at least about 3% by weight of the product, (c) reducing the water content of the product (b) to less than about 3% by weight and, (d) recovering the high carbonate content overbased borated product.

The products of the above processes as well as an overbased borated product having a mean particle diameter of less than about 9 microns is also described as follows.

A. The Overbased Material—The overbased components utilized herein are any of those materials typically utilized for lubricating oils or greases. The anion of the overbased component is typically a sulfonate, phenate, carboxylate, phosphate or similar material. Especially preferred herein are the anionic portions which are sulfonates. Typically the useful sulfonates will be mono- or di-hydrocarbyl substituted aromatic compounds. Such materials are typically obtained from the by-products of detergent manufacture. The products are conveniently mono- or di-sulfonated and the hydrocarbyl substituted portion of the aromatic compound are typically alkyls containing about 10 to 30, preferably about 14 to 28 carbon atoms.

The cationic portion of the overbased material is typically an alkali metal or alkaline earth metal. The commonly used alkali metals are lithium, potassium and sodium, with sodium being preferred. The alkaline earth metal components typically utilized are magnesium, calcium and barium with calcium and magnesium being the preferred materials.

The overbasing is accomplished utilizing an alkaline earth metal or alkali metal hydroxide. The overbasing is accomplished by utilizing typically any acid which may be bubbled through the component to be overbased. The preferred acidic material for overbasing the components of the present invention is carbon dioxide as it provides the source of carbonate in the product. As it has been noted that the present invention utilizes conventionally obtained overbased materials, no more is stated within this regard.

The preferred overbasing cation is sodium and the overall preferred product is a borated sodium carbonate overbased sodium sulfonate. A second preferred product herein is a borated sodium carbonate overbased calcium sulfonate.

The overbasing is generally done such that the metal ratio is from about 1.05:1 to about 50:1, preferably 2:1 to about 30:1 and most preferably from about 4:1 to about 25:1. The metal ratio is that ratio of metallic ions on an equivalent basis to the anionic portion of the overbased material.

B. The Inert Liquid Medium—The inert liquid medium when utilized to obtain the borated product facilitates mixing of the ingredients. That is, the overbased materials tend to be rather viscous especially when the alkaline earth metal components are utilized. Thus, the inert liquid medium serves to disperse the product and to facilitate mixing of the ingredients. The inert liquid medium is typically a material which boils at a temperature much greater than that of water and which is useful in the end product for which the invention is intended.

Typically, the inert liquid medium is a member selected from the group consisting of aromatics, aliphatics, alkanols and mineral oil and mixtures thereof. The aromatics utilized are typically benzene or toluene while the aliphatics are materials having from about 6 to about 600 carbon atoms. The alkanols may be mono-or di-alkanols and are preferably those materials which have limited water solubility. typically, alkanols containing 10 or less carbon atoms are useful herein. Mineral oil, when used as the inert liquid medium is a typically defined by the ASTM standards.

The insert liquid medium may be omitted where, for example, the product is extruded. In such cases mechanical mixing replaces the need for a solvent.

C. The Carbon Dioxide Component—the carbon dioxide content of product (d) is typically greater than about 5% by weight. It is desirable that the carbon dioxide content of product (d) be between 5.5% and about 12% by weight. The weights given herein are by weight of the total product including the inert medium. The carbon dioxide content of the products is obtained by acidifying the product to liberate all of the $CO_2$ in the product. For purposes herein, the terms carbon dioxide and carbonate are identical. That is, the carbonate is the chemically incorporated form of the carbon dioxide and the latter is the compound used to specify the amount of carbonate in the product. Thus, the ratios expressed herein use the molecular weight (44) of carbon dioxide.

D. The Borating Agent is conveniently orthoboric acid. Also useful herein are boron halides such as boron trifluoride, polymers of boric acid, boron anhydride, boron esters, and similar materials. The boron content of the products of the present invention is typically greater than 3%, preferably greater tan 4% and most preferably greater than 5% by weight of the product. It is also desirable that the weight percent of carbon dioxide in the product (d) is at least 50% by weight of the boron in product (d). Preferably, the present carbon dioxide to the percent boron is greater than 75% and most preferably greater than 100% by weight of the boron.

E. The Water Content of the product when it is finished is typically less than 3% by weight. At levels much greater than 2% by weight substantial amounts of the boron can be lost by forming boron compounds which are soluble in the water and which are separated off. If the separation does not occur during processing, then during storage, the boron content may be diminished by having unacceptably high levels of water in the product. More preferably, the water content of the product is less than 1% by weight and most preferably less than 0.75% by weight.

F. The Processing—The products herein are conventionally obtained up to the point where the boron incorporated occurs. That is, the boronation aspect to obtain the alkali metal or alkaline earth metal overbased sulfonate is downstream from the carbonation facility. If desired, carbonation may continue; however, such is not necessary and hinders the boronation in addition to raising the cost of the product.

The mixture (a) as defined above is treated at (b) at a temperature less than that at which substantial foaming occurs. Such temperature is typically less than 110° C., more preferably less than 99° C., and most preferably between about 66° C. and about 88° C. It is also desirable that the temperature is raised during the boronation but not raised so rapidly as to cause substantial foaming. not only does the foaming cause a loss of head space in the reaction vessel with a concomitant blocking of reaction ports but the product is not believed to be the same if it is rapidly liberated of carbon dioxide. That is, there is an exchange reaction occurring between the carbon dioxide portion of the overbased materiel and the borating agent wherein boron polymers are incorporated into the overbased material. Thus, the boronation is allowed to occur without substantial foaming until the point where substantially no more boron is taken up by the overbased material.

At the point where the boron is substantially chemically incorporated within the overbased material, the temperature is then raised to a point in excess of the boiling point of water within the mixture (b). Such temperatures are typically in excess of 100° C. as the water tends to separate rapidly from the reaction mass at that temperature. Conveniently, the temperature for removing the water is between about 120° C. and 180° C. As the boronation is substantially complete and the carbon dioxide content of the product is stable, substantial forming is avoided at the point where the water is taken from the product. Thus, little carbon dioxide will be liberated between steps (c) and (d). The temperature conditions are typically not lowered substantially during steps (c) and/or (d), especially during (c).

The product is typically recovered as the high carbonate content borated product by allowing the product to cool, followed by suitable packaging. Of course, the product is slightly hygroscopic due to the high inorganic content and, thus, protective packaging is recommended. The product (d) may also be recovered by transferring it for downstream processing such as mixing it with additional materials such as an oil of lubricating viscosity or other desired components for a lubricant or a grease. A significant advantage in practicing the present invention is that the boronation is brought about without alternatively raising and lowering the temperature, especially during sequential addition of the boronating agent.

It is desired that the mean particle diameter of the products obtained herein is less than 9 microns, preferably less than 8 microns and most preferably less than 5 microns. Preferably, the particle size distribution is such that substantially all of the particles are less than 9 microns, more preferably less than 9 microns, more preferably less than 8 microns and most preferably less than 5 microns. Thus, the products obtained herein are substantially different than those known in the art in that the fine particle size obtained herein allows effective dispersion in an oil or grease thereby giving effective protection for the metal surfaces with which the product is brought into contact. General guidance in determining the particles size herein is found in the *Textbook of Polymer Science* by Billmeyer, fourth printing, March 1966, Library of Congress Catalog Card No. 62-18350.

The preferred detergents of the present invention are overbased Magnesium Sulphonates with TBN number in the range of roughly 400 (as determined by ASTM-D2896) or greater when made up with an oil content of 50–60%. High TBN sulphonates are available from Witco Chemicals or may be synthesized as described herein. The detergent range comprises 15–55% by weight of the additive package and about 1–15% weight percent of the fluid blend. The preferred range of detergent in the fluid blend is about 3 to 8% by weight.

The metal ion content of the fluid formulation as contributed from the acid metal salts ranges from 0.1–5% by weight.

Also included in the additive package are extreme pressure agents/antiwear compositions/friction modifiers which protect moving parts from wear. These components act by coating metal parts with a protective film. Preferred antiwear agents are metal salts of phosphorodithioic acid. The metals are Group 11 metals such as aluminum, tin, cobalt, lead, molybdenum, manganese, nickel and zinc with zinc being preferred. Mixtures of two or more metal salts may be used.

The phosphorodithioic acids are represented by formula

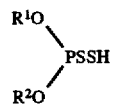

wherein $R^1$ and $R^2$ are the same or different and $R^1$ and $R^2$ are hydrocarbon based groups.

The phosphorus acids can be prepared by methods well known in the art and generally are prepared by the reaction of phosphorus pentasulfide ($P_2S_5$) with an alcohol or a phenol, or a mixture of alcohols. The reaction involves mixing at a temperature of about 20° to about 200° C., four moles of the alcohol or phenol with one mole of phosphorus pentasulfide. Hydrogen sulfide is liberated in this reaction.

Preferably, the hydrocarbon-based groups in the compounds useful as component (I) according to this invention are free from acetylenic and usually also from ethylenic unsaturation and have from 1 to about 50 carbon atoms, preferably 1 to about 30 carbon atoms, and more preferably from about 3 to about 18 carbon atoms. R' and R$^2$ are most often identical, although they may be different and either or both may be mixtures. The groups are usually hydrocarbon, preferably alkyl, and most desirably branched alkyl. Examples of R' and R$^2$ groups include isopropyl, isobutyl, 4-methyl-2-pentyl, 2-ethylhexyl, isooctyl, etc.

The metal salts of the phosphorodithioic acid are prepared by reacting the acid with suitable metal bases. The metal bases include the free metals enumerated above and their oxides, hydroxides, alkoxides and basic salts. Examples are sodium hydroxide, sodium methoxide, sodium carbonate, potassium hydroxide, potassium carbonate, magnesium oxide, magnesium hydroxide, calcium acetate, zinc oxide, zinc acetate, lead oxide, nickel oxide and the like.

The temperature at which the metal salts of this invention are prepared is generally between about 30° and about 150° C., preferably up to about 125° C.

It is frequently advantageous to conduct the reaction in the presence of a substantially inert, normally liquid organic diluent such as naphtha, benzene, xylene, mineral oil or the like. If the diluent is mineral oil or is physically and chemically similar to mineral oil, it frequently need not be removed before using the metal salts in the composition, concentrates and functional fluids of the invention.

The preparation of the metal salts useful in this invention is illustrated by the following examples. All parts and percentages are by weight.

The term "neutral salt" refers to salts characterized by metal content equal to that which would be present according to the stoichiometry of the metal and the particular organic compound reacted with the metal. Thus, if a phosphorodithioic acid, (RO)$_2$PSSH, is neutralized with a basic metal compound, e.g., zinc oxide, the neutral metal salt produced would contain one equivalent of zinc for each equivalent of acid, i.e., [(RO)$_2$PSS]$_2$Zn.

However, with the present invention, the metal product can contain more or less than the stoichiometric amount of metal. The products containing less than the stoichiometric amount of metal are acidic materials. The products containing more than the stoichiometric amount of metal are overbased materials. For example, salts containing 80% of the metal present in the corresponding neutral salt are acidic, while salts containing 110% of the metal present in the corresponding neutral salt are overbased. The metal components may have about 80% to about 200%, preferably about 100% to about 150%, more preferably about 100% to about 135%, and advantageously about 103% to about 110% of the metal present in the corresponding neutral salt.

The preferred metal salt of the present invention is zinc diisooctyl dithiophosphate.

The dithiophosphates are present in the additive package at about 5–30 weight percent and in the fluid blend at 0.5–10% by weight. The preferred range is 0.5–5% by weight of the fluid blend.

It should be noted that the zinc dithiophosphate also serves an antioxidant function.

For a discussion of phosphorus containing metal salts U.S. Pat. No. 4,466,894 which is incorporated by reference for disclosure pertinent to this invention.

Other compound types of use as EP/antiwear/friction modifiers agents are sulfurized fats, sulfurized fatty acids, sulfurized olefins, sulfurized partial fatty acid esters, sulfurized polyolefins and oligomers thereof. Also useful are organic phosphites. Both classes of compounds also serve as oxidation and corrosion inhibitors. Sulfurized compounds useful in this invention are sulfurized:

(1) fats such as lard, sperm oil, soybean oil, cotton seed oil, sunflower oil;

(2) fatty acids such as oleic, linoleic and linolenic;

(3) partial fatty esters of polyhydric alcohols or monohydric alcohols;

(4) polyolefins, olefins, and oligimers of olefinic compounds;

(5) alpha-olefin;

(6) tall oil fatty acids, and equivalents and mixtures thereof. The plant oils and fatty acids are available from many commercial sources as are the polyolefins and for instance the $\propto$-olefins and particularly C$_6$–C$_{18}$ α-olefins which are available from the Ethyl Corporation. U.S. Pat. 4,957,651 and references cited therein gives an extensive background for sulfurized organics and is incorporated herein by reference for disclosure pertinent to this invention.

The term "fatty acid" as used in the specification and claims refers to acids which may be obtained by the hydrolysis of a naturally occurring vegetable or animal fat or oil. These acids usually contain from 8 to 22 carbon atoms and include, for example, oleic acid, linoleic acid, etc. Acids containing 16 to 20 carbon atoms are preferred, and those containing 16 to 18 carbon atoms are especially preferred.

Habiby, in U.S. Pat. Nos. 3,926,822 and 3,953,347 describe a composition comprising a sulfurized mixture of a fatty acid ester of a mono- or polyhydric alcohol, a fatty acid and an aliphatic olefin. Newingham et al. in U.S. Pat. Nos. 3,825,495 and 4,180,466 teaches lubrication of controlled-slip differentials with a composition comprising a cosulfurized blend of a triglyceride and a monoolefin. Recchuite, in a series of U.S. Patents, for example U.S. Pat. Nos. 4,166, 796; 4,166,797; 4,321,153 and 4,456,540 teaches compositions comprising a cosulfurized mixture of triglycerides and an olefinic hydrocarbon. The '540 patent also recites the presence of a fatty acid in the reaction mixture. In U.S. Pat. No. 4,166,795, Recchuite teaches the reaction product of sulfur, lard oil, polyisobutylene oligomers and optionally another unsaturated material. All of these patents describe the use of these sulfurized mixtures in lubricants. Other sulfurized fatty acid esters are described in Lincoln et al, U.S. Pat. No. 2,113,811; Wasson et al, U.S. Pat. No. 2,672, 444; Ebby, U.S. Pat. No. 2,680,718; Wakim, U.S. Pat. No. 3,986,966; Zipf, U.S. Pat. No. 4,036,769; Hotten, U.S. Pat. No. 4,053,427; and Jackisch, U.S. Pat. No. 4,176,072 and in PCT Publication WO86/06371.

Numerous patents describe the use of various partial esters of polyhydric alcohols as friction modifiers, emulsifiers, lubricity agents and corrosion inhibitors. These include Adams et al, U.S. Pat. No. 2,268,234; Schwartz, U.S. Pat. No. 2,412,633; Barnum, U.S. Pat. No. 2,564,423; Adelson et al, U.S. Pat. No. 2,628,941; Wasson et al, U.S. Pat. No. 2,672,444; Bondi et al, U.S. Pat. No. 2,788,326; Wisotsky, U.S. Pat. No. 4,505,829 and U.K. patent application 2,038,355.

Suitable partial fatty acid esters can be prepared by methods known in the art and then sulfurized. One method for preparing monoglycerides of fatty acids from fats and oils is described in Birnbaum, U.S. Pat. No. 2,875,221. This patent teaches a continuous process for reacting glycerol and fats to provide a product having a high proportion of monoglyceride. Furthermore, many glycerol esters are commercially available,. Such esters usually contain at least about 30% by weight of the preferred monoester, generally from about 35 to about 65% by weight monoester, about 30 to about 50% by weight diester, and the balance, in the aggregate, usually is no more than about 15%, more often less than about 10% by weight of triester, free fatty acid and other components.

Another method for preparing compositions comprising partial fatty acid esters of this invention is described in the following example.

EXAMPLE 1

A mixture of glycerol oleates is prepared by reacting 882 parts of a high oleic content sunflower oil which comprises about 80% oleic, about 10% linoleic and the balance saturated triglycerides, and which contains less than 1% by weight acidity measured as oleic acid, and 499 parts glycerol in the presence of a catalyst prepared by dissolving KOH in glycerol to yield a material containing about 16.7% by weight alkoxide. The reaction is conducted by heating the mixture to 155° C. under a nitrogen sparge, then heating under nitrogen, for 13 hours at 155° C. The materials are cooled to less than 100° C., then 9.05 parts 85% $H_3PO_4$ is added to neutralize the catalyst. The neutralized reaction mixture is transferred to a 2-liter separatory funnel. The lower layer is removed and discarded. The upper layer is the product which contains, by analysis, 56.9% by weight glycerol monooleate, 33.3% glycerol dioleate (primarily 1,2-) and 9.8% glycerol trioleate.

Specific examples of commercially available materials comprising partial fatty acid esters of glycerol include Emery 2421 (Emery Industries, Inc.), Cap City GMO (Capital), DUR-EM 114, DUR-EM GMO, etc. (Durkee Industrial Foods, Inc.) and various materials identified under the mark Mazol GMO (Mazer Chemicals, Inc.). Other partial fatty acid esters of polyhydric alcohols are described in K. S. Markley, Ed., "Fatty Acids", second edition, parts I and V, Interscience Publishers (1968). Numerous commercially available fatty acid esters of polyhydric alcohols are listed by tradename and manufacturer in the two volumes: McCutcheon's Functional Materials and McCutcheon's Emulsifiers and Detergents, North American and International Editions (1987).

A preferred component of the invention is a sulfurized fully esterfied ester triglyceride, especially wherein the acid moiety is derived from oleic acid. Especially preferred are the fatty oils, that is, naturally occurring esters of glycerol with the above-noted long chain carboxylic acids, and synthetic esters of similar structure. Still more preferred are fatty oils derived from unsaturated acids, especially oleic and linoleic, including such naturally occurring animal and vegetable oils such as lard oil, peanut oil, cottonseed oil, soybean oil, corn oil, sunflower seed oil and others. Specially grown sunflowers yield an oil containing high amounts of oleic acid (e.g., greater than 80% or more by weight of oleic acid). Such sunflower oils are available commercially under the trademark TRISUN® from SVO Enterprises Corporation.

Another preferred component is at least one sulfurized fatty acid as described hereinabove. It is usually an unsaturated fatty acid such as oleic or linoleic acid, and may be a mixture of acids such as obtained from tall oil or by the hydrolysis of peanut oil, soybean oil or the like.

The invention can contain at least one sulfurized olefin. This olefin is preferably an aliphatic olefin. That is, it is essentially free of aromatic groups such as phenyl groups, naphthyl groups and the like. The olefin usually will contain from about 4 to about 40 carbon atoms, preferably from about 8 to about 36 carbon atoms. Terminal olefins, or alpha-olefins, are preferred, especially those having from 12 to 20 carbon atoms. Olefins having internal double bonds are also useful. Mixtures of these olefins are commercially available, and such mixtures are contemplated for use in this invention.

Another included component is a fatty acid ester of a monohydric alcohol. Such a fatty acid ester is one which may be considered as being derived from a fatty acid as described hereinabove with an aliphatic monohydric alcohol such as methanol, ethanol, n-propanol, isopropanol, the butanols, etc. Mixtures thereof are also useful. These esters can be prepared by methods well known in the art. Such fatty acid esters of monohydric alcohols are also commercially available from numerous sources. The component listed above contains various hydrocarbon groups such as alkyl or alkenyl groups, alkylene groups, etc. These hydrocarbon groups may contain non-hydrocarbon substituents or heteroatoms, provided such non-hydrocarbon substituents or heteroatoms do not significantly detract from the essentially hydrocarbon nature of the hydrocarbon group. Suitable non-hydrocarbon substituents include, but are not limited to halo groups, such as chlorine, bromine, etc., mercapto groups, alkoxy groups, etc., and the like. Heteroatoms include, for example, sulfur, oxygen, nitrogen, and the like. Generally, there will be no more than one non-hydrocarbon group present per 10 carbon atoms in a hydrocarbon group. More preferably no more than one such substituent or heteroatom is present per 20 carbon atoms. Preferably, the hydrocarbon groups are purely hydrocarbon; that is, they contain carbon and hydrogen, and are essentially free of non-hydrocarbon substituents or heteroatoms.

A sulfurized olefin is included in the present invention as a friction modifier which also functions as an extreme pressure agent. Extreme pressure agents are materials which prevent metal to metal damage, e.g., contact, when gears are engaged and meshed. The sulfurization of olefins is generally known as is evidenced by U.S. Pat. No. 4,191,659 as previously disclosed.

The sulfurized olefins which are useful in the present invention are those materials formed from olefins which have been reacted with sulfur. Thus, an olefin is defined as a compound having a double bond connecting two aliphatic carbon atoms. In its broadest sense, the olefin may be defined by the formula $R^1R^2C=CR^3R^4$, wherein each of $R^1$, $R^2$, $R^3$ and $R^4$ is hydrogen or an organic radical. In general, the R values in the above formula which are not hydrogen may be satisfied by such groups as $—C(R^5)_3$, $—COOR^5$, $—CON(R^5)_2$, $—COON(R^5)_4$, $—COOM$, $—CN$, $—C(R^5)=C(R^5)_2$, $—YR^5$ or $—Ar$.

Each $R^5$ is independently hydrogen, alkyl, alkenyl, aryl, substituted alkyl, substituted alkenyl or substituted aryl, with the proviso that any two $R^5$ groups can be alkylene or substituted alkylene whereby a ring of up to about 12 carbon atoms can be formed;

M is one equivalent of a metal cation (preferably Group I or II, e.g., sodium, potassium, magnesium, barium, calcium);

X is halogen (e.g., chloro, bromo, or iodo);

Y is oxygen or divalent sulfur; and

Ar is an aryl or substituted aryl radical of up to about 12 carbon atoms.

Any two of $R^1$, $R^2$, $R^3$ and $R^4$ may also together form an alkylene or substituted alkylene group; i.e., the olefinic compound may be alicyclic.

The nature of the substituents in the substituted moieties described above are not normally a critical aspect of the invention and any such substituent is useful so long as it is, or can be made compatible, with lubricating environments and does not interfere under the contemplated reaction conditions. Thus, substituted compounds which are so unstable as to deleteriously decompose under the reaction conditions employed are not contemplated. However, certain substituents such as keto or a dehydo can desirably undergo sulfurization. The selection of suitable substituents is within the skill of the art or may be established through routine testing. Typical of such substituents include any of the above-listed moieties as well as hydroxy, amidine, amino, sulfonyl, sulfinyl, sulfonate, nitro, phosphate, phosphite, alkali metal mercapto and the like.

The olefinic compound is usually one in which each R value which is not hydrogen is independently alkyl, alkenyl or aryl, or (less often) a corresponding substituted radical. Monoolefinic and diolefinic compounds, particularly the former, are preferred, and especially terminal monoolefinic hydrocarbons; that is, those compounds in which $R^3$ and $R^4$ are hydrogen and $R^1$ and $R^2$ are alkyl or aryl, especially alkyl (that is, the olefin is aliphatic). Olefinic compounds having about 3 to 30 and especially about 3 to 18 (most often less than 9) carbon atoms are particularly desirable.

Isobutene, propylene and their oligomers such as dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

Various sulfurized olefins which are useful in the present invention are shown in Table I below:

TABLE I

| Example | Olefinic compounds | Molar ratio[1] | Temp. °C. | % sulfur in Product |
|---|---|---|---|---|
| (a) | Isobutene; 1-butene[2] | 1:1:0.5 | 171 | 46.9 |
| (b) | 1-Octene | 1:1.5:0.5 | 171 | 34.3 |
| (c) | Isobutene; 1-octene[3] | 1:1:0.5 | 171 | 44 |
| (d) | Diisobutene | 1:1.5:0.5 | 171 | 41 |
| (e) | $C_{16}$-$C_{18}$ a-olefin | 1:1.5:0.5 | 171 | 20.6 |
| (f) | Cyclohexene | 1:1:0.5 | 171 | 31.8 |
| (g) | Isobutene; 1-hexene[2] | 1:1:0.5 | 171 | 39.5 |
| (h) | Methyl oleate | 1:1.5:0.5 | 171 | 16.5 |
| (i) | a-Methylstyrene | 1:1:0.5 | 171 | 39.2 |
| (j) | Isobutene; butadiene[3] | 1:1:0.5 | 171 | 47.2 |
| (k) | Polyisobutene[4] | 1:1.5:0.5 | 171 | 2.6 |
| (l) | Triisobutene[5] | 1:1.5:0.5 | 171 | — |
| (m) | 1-Butene | 1:1:0.5 | 138–171 | 49.5 |
| (n) | Isodecyl acrylate | 1:0.5:0.5 | 171 | 13.1 |
| (o) | Diels-Alder adduct of butadiene and butyl acrylate | 1:1.5:0.5 | 171 | 25.1 |
| (p) | 2-Butene[6] | 1:1:0.5 | 171 | 48.9 |
| (q) | Turpentine | 1:1.5:0.5 | 171 | 39.2 |

[1]Olefinic compound(s): S:H$_2$S
[2]1:1 molar ratio
[3]0.9:01 molar ration
[4]Number average molecular weight of about 1000 as determined by vapor pressure osmometry.
[5]No separation step.
[6]C is a trans isomers The components listed above may be sulfurized as a mixture or individually. The sulfurization reaction generally is effected at an elevated temperature, often from about 50° to about 350° C., more preferably, at a temperature of from about 100° to about 210° C. The reaction is effected with efficient agitation and often in an inert atmosphere such as nitrogen. If any of the reagents are appreciably volatile at the reaction temperature, the reaction vessel may be sealed and maintained under pressure. Although generally not necessary, the reaction may be affected in the presence of an inert solvent such as an alcohol, ether, ester, aliphatic hydrocarbon, halogenated aromatic hydrocarbon, etc., which is a liquid within the temperature range employed for the reaction.

The sulfurizing agents useful in the process of the present invention include elemental sulfur, hydrogen sulfide, sulfur halide, sodium sulfide and a mixture of hydrogen sulfide and sulfur or sulfur dioxide, etc. Preferably, the sulfurizing agent is elemental sulfur. It is frequently advantageous to add the sulfurizing agent portion wise to the mixture of the other reagents. When elemental sulfur is utilized as a sulfurizing agent, the reaction is in some instances exothermic, which can be utilized as a cost-cutting benefit since no, or at least reduced, external heating may be required. The amount of sulfur or sulfurizing agent added to the reaction mixture can be varied over a wide range although the amount included in the reaction mixture should be an amount sufficient to provide a sulfurized product containing the desired amount of sulfur.

Usually, the amount of sulfur or sulfurizing agent employed in the preparation of the sulfurized component of this invention is calculated based on the total olefinic unsaturation of the mixture. A monoolefinic reactant, such as an alpha-olefin or oleic acid, for example, contains one mole of olefinic bonds per mole of reactant. A polyolefinic material contains 2 or more moles of olefinic bonds. For example, 1,4-hexadiene contains 2 moles of olefinic bonds. In general, from about 0.01 to about 6 moles of sulfur, present as elemental sulfur or as sulfur present in another sulfurizing reactant, may be employed per mole of olefinic bonds. More often from 0.5 to about 3 moles of sulfur are employed per mole of olefinic bonds.

Accordingly, the sulfur content of any given sulfurized composition useful in this invention depends on the amount of sulfur present in the sulfurization mixture and on the nature and amount of reactants present in the mixture comprising reactants. Compositions containing from 2 to about 40 percent by weight sulfur are common and preferred are those containing from about 5 to about 25 weight percent of sulfur.

The sulfurization reaction may be conducted in the presence of various catalysts such as amines and other catalysts known to assist sulfurization reactions. A number of useful catalysts are described in U.S. Pat. No. 4,191,659 which is expressly incorporated herein by reference for relevant disclosures in this regard.

Following the sulfurization reaction, it is preferred to remove substantially all low boiling materials, typically by venting the reaction vessel, by sparging with an inert gas such as nitrogen, by vacuum distillation or stripping, etc. Insoluble by-products may be removed by filtration if necessary, usually at an elevated temperature (about 50°–120° C.).

A further optional step in the preparation of the sulfurized mixture, is treatment of the sulfurized product obtained as described above to reduce any active sulfur which may be present. An illustrative method involves contacting the sulfurized composition with an alkali metal sulfide. Other optional treatments may be employed to improve product quality such as odor, color, and staining characteristics of the sulfurized compositions.

Below gives a sulfurization procedure for a mixture containing a $C_{16-18}$ alpha-olefin mixture (Neodene TM, 16-18 Shell).

EXAMPLE 2

A 1-liter, 4-necked flash equipped with a stirrer, theremowell, reflux condenser to Dean-Stark trap and a sub-surface gas inlet tube is charged with 45 parts soybean oil, 75 parts of a mixture of $C_{6-18}$ alpha-olefins (Neodene TM 16–18, Shell), 50 parts oleic acid (Pamolyn 100) and 330 parts of the glycerol oleate mixture described in EXAMPLE 4. This mixture is heated to 145° C. under a nitrogen sparge. Nitrogen is discontinued, and 58.7 parts sulfur are added in two increments, 15 minutes apart. The materials are heated to 195° C. and held at 195° C. for 1.5 hours. A nitrogen sparge is resumed and heating is continued at 195° C. for 2 hours. The reaction mixture is filtered at 95° C. through a diatomaceous earth filter aid. The filtrate, containing 9.95% sulfur by analysis, is the product.

The sulfurized components of the invention as listed above are included in the additive package in the range of about 5–30% based on the weight of the additive package with the preferred range being 10–20%. As a component of a formulated fluid the sulfurized compounds are included in the fluid in a range of about 0.5–10% weight percent based on the weight of said fluid. The preferred range for the sulfurized components in said fluid is about 0.5–10% by weight.

Also included in the additive package of this invention are organic phosphites which can serve as EP/antiwear agents, lubricity improvers, and antioxidants. The phosphites are generally of formula $(RO)_2POH$. The preferred dialkylated phosphites as shown in the preceding formula is typically present with minor amounts of monoalkylated phosphite of the formula $(RO)(HO))_2POH$. Many phosphites are available from commercial sources, or they may be synthesized ascending to U.S. Pat. No. 4,752,416 to Scharf et al. An example of mixed phosphites synthesis is given below as EXAMPLE 3.

EXAMPLE 3

A mixture of 911.4 parts (7 moles) of 2-ethylhexanol, 1022 parts (7 moles) of Alfol 8-10, and 777.7 parts (7 moles) of dimethylphosphite is prepared and heated to 125° C. while sparging with nitrogen and removing methanol as a distillate. After about 6 hours, the mixture is heated to 145° C. and maintained at this temperature for an additional 6 hours whereupon about 406 parts of distillate are recovered. The reaction mixture is stripped to 150° C. at 50 mm. Hg., and an additional 40 parts of distillate are recovered. The residue is filtered through a filter aid and the filtrate is the desired mixed phosphate containing 9.6% phosphorus (theory, 9.7%).

In the above structure of the phosphite, the term "R" has been referred to as an alkyl or aryl group. It is, of course, possible that the alkyl is alkenyl and thus the terms "alkyl" and "alkylated", as used therein, embrace other than saturated alkyl groups within the phosphite. The phosphite utilized herein is thus one having sufficient hydrocarbyl groups to render the phosphite substantially oleophilic and further that the hydrocarbyl groups are preferably substantially unbranched.

It is preferred that the phosphite contain from about 8 to about 24 carbon atoms in each of the fatty radicals described as "R". Preferably, the fatty phosphite contains from about 12 to about 22 carbon atoms in each of the fatty radicals, most preferably from about 16 to about 20 carbon atoms in each of the fatty radicals. It is highly preferred that the fatty phosphite be formed from oleyl groups, thus having 18 carbon atoms in each fatty radical.

Preferred phosphites are dioleyl and dilauryl and dibutyl and alkylphenyl phosphite and mixtures thereof. As well as the phosphites listed above organic acid phosphates can also be utilized in this invention. Examples of useful phosphates are mono- and di-steryl acid phosphates, lauryl acid phosphates and oleyl acid phosphates.

The phosphites and phosphates are included in the additive package of this invention in the range of 5–30 weight percent based on the weight of the additive package with the preferred range being 6–12 percent by weight. The compounds are included in the final fluid blend in the range of 0.5–10% weight percent based on the weight of the fluid with the preferred range being 0.75–5% weight percent based on the weight of the fluid.

Friction modifiers other than those stated above may also be included in this invention. Friction modifiers are exceedingly well known in the art and the number and types of compounds are voluminous. In general friction modifiers comprise:

metal salts of fatty acids
fatty phosphites
fatty acid amides
fatty epoxides and borated derivatives
fatty amines
glycerol esters and then borated derivatives
alkoxylated fatty amines and their borated derivatives
sulfurized olefins, sulfurized polyolefins
sulfurized fats and sulfurized fatty acids This list is not intended to be exhaustive but rather representative of friction modifiers as a group. It should be noted that several classes of compounds listed have previous been reference previously herein as EP/antiwear and an antioxidation agents. Descriptions of friction modifiers, their borated derivatives and their availability or method of preparation can be found in the following U.S. Pat. Nos. 4,280,916; 4,792,410; 3,652,410; 4,957,651; 4,119,549; 4,191,659; 4,584,115; 4,622,158; 4,741,848; 4,752,416 and references cited therein. All patents cited are herein incorporated by reference for their teachings in friction modifiers.

For the instant invention several of the above listed friction modifiers are equivalent. The friction modifiers are incorporated into the additive package in the range of about 5–30 weight percent of the package. When contained in a formulated fluid said friction modifier comprises a range of about 0.5–10% by weight based on the weight of said fluid.

Preferred friction modifiers of the instant invention are fatty acid amides which have been discussed in detail in U.S. Pat. No. 4,280,916. The preferred amides are $C_8-C_{24}$ aliphatic monocarboxylic amides. The amides involved are well known. Reacting the fatty acid base compound with ammonia produces the fatty amide. The fatty acids and amides derived therefrom may be either saturated or unsaturated. The most important fatty acids are lauric —$C_{12}$, palmitic —$C_{16}$ and steric $C_{18}$. The most important unsaturated are oleic, linoleic and linolenic, all of which are $C_{18}$. The preferred fatty amides of the instant invention are those derived from the $C_{18}$ unsaturated fatty acids. The fatty amides are included in the additive package in the range of 0.5–10% by weight. They are present in the final blend in the range of 0.05–3% by weight.

Other components which may form a part of the additive package and formulated fluid of the instant invention are sulfolanes or the like or equivalents thereof which are used as seal swells. Also present are anti-foaming agents such as silicon and the like and pour point depressants and in the case of the additive package in terms of volume, viscosity and readability of the additive composition. Diluent oils are present in the additive package in the amount and kinds appropriate for the purposes required. A common diluent oil is 100N high pour oil and said diluent oils may be present in the additive package in the range of from 1–30 weight percent based on the weight of the package. The diluent oil is then carried over into the formulated fluid at a diluted weight percent which depends upon the weight of the formulated fluid.

Sulfone and sulfolane seal swells are also included in the additive package and are discussed in detail in U.S. Pat. No. 4,209,587 by Koch which is incorporated herein by reference for disclosure pertinent to the instant invention. A preferred group of seal swell agents are 3-alkoxy-sulfolanes in which the alkoxy group has at least about 4 and preferably about 4–25 carbon atoms. Preferred sulfolanes are those in which the alkoxyl group is isodecyl or isobutyl in combination with primary amyl with the isobutoxy sulfolane comprising about 25–75 weight percent of said composition. The sulfolane and sulfones are incorporated into said additive package in the range of about 1–12 weight percent based on the weight of the package. A preferred range is about 2–6 or 8 weight percent. When the additive package containing said seal swell is diluted to from said formulated fluid the seal swell comprises about 0.1–3 weight percent of said fluid and more preferably 0.2–2 weight percent based on the weight of said formulated fluid.

In addition to the base oil and additive package, the formulated lubricating/functional fluid further comprises a viscosity modifier or viscosity Index Improver. Viscosity modifiers are extremely well known in the art and most are commercially available. Hydrocarbon VM's include polybutenes, poly-(ethylene/propylene) copolymers and polystyrene with butadiene or isoprene. Ester VM's include esters of styrene/maleic anhydrides and polymethacrylates. The acrylates are available from Rhom and Haas and Lubrizol; polybutenes from Ethyl Corporation and Lubrizol; ethylene/propylene copolymers from EXXON and TEXACO; polystyrene/isoprene from Shell; styrene maleic esters from Lubrizol and polystyrene/butadiene from BASF.

In the instant invention the preferred VM is an oil soluble polyalkene with about $\overline{Mn}$ 500–3,000. However, the VM could be any of the above mentioned VM's with sufficient shear stability. The polyalkenes are chose as the VM because of their shear stability and the viscosity requirements of the final functional/lubricating fluid.

Polyalkenes are available from The Ethyl Corporation and many other sources and may also be prepared by polymerization methods well known in the art. On an oil free basis the VM comprises in the range of 1–25 weight percent of the function/lubricating fluid based on the weight of the fluid. A preferred range from the polyolefin is 4–15 weight percent of the fluid. The preferred $\overline{Mn}$ of the polyalkene VM is in the range of 1,000–3,000.

The polyalkene viscosity modifiers have a kinematic viscosity at 100° C. in the range of 200–4,400 cSt. When added to a formulated functional fluid in the amounts specified above, the fluid becomes shear stable in a manner defined below. When determined by the Tapered Bearing Shear Test described earlier, the 100° C. viscosity drop is in the range of under 20% after a 20 hour test. The preferred range is under 10%.

The polyalkenes are homopolymers and interpolymers of polymerizable olefin monomers of 2 to about 16 carbon atoms; usually 2 to about 6 carbon atoms. The interpolymers are those in which two or more olefin monomers are interpolymerized according to well-known conventional procedures to form polyalkenes having units within their structure derived from each of said two or more olefin monomers. Thus, "interpolymer(s)" as used herein is inclusive of copolymers, terpolymers, tetrapolymers, and the like. As will be apparent to those of ordinary skill in the art, the polyalkenes from which the substituent groups are derived are often conventionally referred to as "polyolefin(s)".

The olefin monomers from which the polyalkenes are derived are polymerizable olefin monomers characterized by the presence of one or more ethylenically unsaturated groups (i.e., >C=C<); that is, they are mono-olefinic monomers such as ethylene, propylene, butene-1, isobutene, and octene-1 or polyolefinic monomers (usually diolefinic monomers) such as butadiene-1,3 and isoprene.

These olefin monomers are usually polymerizable terminal olefins; that is, olefins characterized by the presence in their structure of the group >C=CH$_2$. However, polymerizable internal olefin monomers (sometimes referred to in the patent literature as medial olefins) characterized by the presence within their structure of the group:

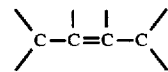

can also be used to form the polyalkenes.

Prescribed amounts of dispersant may also be included in the formulated function/lubricating fluid. The dispersant is included in the formulated fluid in the range of 0.1–10 weight percent base on the weight of the fluid. A preferred amount of dispersant in said formulated fluid 0.25–4 weight percent.

Dispersants may also be borated, depending upon the goal sought to be obtained by the formulator. The preferred mode of the instant invention encompasses borated and/or non-borated acylated nitrogen compounds made by reacting an aliphatic hydrocarbon substituted carboxylic acylating agent having at least 10 carbon atoms in the aliphatic hydrocarbon substituent with an amino compound having at least one

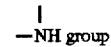

The term "hydrocarbon-based group" is used throughout this specification and in the appended claims to denote a group having a carbon atoms directly attached to the remainder of the molecule and having predominantly hydrocarbon character within the context of this invention. Such groups include the following:

(I) Hydrocarbon radicals; this is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, any two indicated hydrocarbon radicals, e.g., $R^2$ and $R^3$, may together form an alicyclic radical and such radical may contain heteroatoms such as nitrogen, oxygen and sulfur). Such radicals are known to those skilled in the art; representative examples are examples of such radicals as represented by $R^2$, $R^3$ and $R^5$ in the formulae above include methyl, ethyl, butyl, hexyl, octyl, decyl, dodecyl, tetradecyl, octadecyl, eicosyl, cyclohexyl, phenyl and napthyl and the like including all isomeric forms of such radicals and when $R^2$ and $R^3$ together form an alicyclic radical, then examples of such radicals include morpholinyl, piperidyl, piperazinyl, phenothiazinyl, pyrrolyl, pyrrolidyl, thiazolidinyl and the like.

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; representative examples are hydroxy (HO—); alkoxy (RO—); carbalkoxy (RO$_2$C—); acyl [RC(O)—]; acyloxy (RCO$_2$—); carboxamide (H$_2$NC(O)—); acylimidazyl [RC(NR)—]; nitro(—NO$_2$); and alkylthio (RS—) and halogen atoms (e.g., F, Cl, Br and I).

Hetero radicals; that is, radicals which, while predominantly hydrocarbon, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbon-based radical.

Terms such as "alkyl-based radical," "alkenyl-based radical" and "alkylene-based radical," and the like have analogous meanings with respect to alkyl and aryl radicals and the like.

The carboxylic acylating agents include aliphatic hydrocarbon substituted aliphatic, cycloaliphatic and aromatic mono- and polybasic carboxylic acylating agents having at least about 10 carbon atoms in the aliphatic hydrocarbon substituent. These acylating agents include acids, anhydrides, halides and esters, all of which are or can produce the desired acylating agent. Specific examples include, but are not limited to substituted succinic, phthalic, propionic, salicylic, tartaric, phenoxyacetic, and the like. The number of carbon atoms in the hydrocarbon substituent of the acylating agent may vary over a wide range provided that, if borated, boron-containing acylated nitrogen-containing compound is soluble in the lubricating composition of the present invention. Thus, the hydrocarbon substituent generally will contain at least about 10 carbon atoms, preferably an average of at least 30 carbon atoms and often an average of at least about 50 carbon atoms. In addition to oil solubility considerations, other performance considerations will dictate the lower limit on the average number of carbon atoms in the substituent. Determination of the necessary carbon number to attain a particular performance level or performance characteristic is within the skill of the worker having ordinary skill in the art.

The hydrocarbon substituent of the acylating agent may contain polar groups as indicated above, and, providing that he polar groups are not present in proportions sufficiently large to significantly alter the hydrocarbon character of the substituent.

The sources of these substantially hydrocarbon substituents include mono-olefins of at least about 10 carbon atoms, olefin oligomers and high molecular weight substantially saturated petroleum fractions and substantially saturated olefin polymers, particularly polymers of mono-olefins having from 2 to 30 carbon atoms. Mono-olefins particularly useful as sources of the substantially hydrocarbon substituent include decenes, octadecenes, eicosenes and the like. The especially useful polymers are the polymers of 1-mono-olefins, such as ethylene, propene, isobutene, 1-octene, 2-methyl-1-heptene and 2-methyl-5-propyl-1-hexene. Polymers of medial olefins, i.e., olefins in which the olefinic linkage is not at the terminal position, likewise are useful. They are illustrated by 2-butene, 3-pentene and 4-octene.

Also useful are the interpolymers of the olefins such as those illustrated above with other interpolymerizable olefinic substances, such as aromatic olefins, cyclic olefins and polyolefins. Such interpolymers include, for example, those prepared by polymerizing isobutene with styrene; isobutene with butadiene; isobutene with chloroprene; isoprene with p-methyl styrene; 1hexene with 1,3-hexadiene; isobutene with styrene and piperylene; and ethylene with propylene and 1,4-hexadiene; etc.

The use of olefin polymers having molecular weights (Mn) of about 700–10,000 is preferred. Higher molecular weight olefin polymers having molecular weights (Mn) from about 10,000- to about 100,000 or higher have been found to impart also viscosity index improving properties to the final products. The use of such higher molecular weight olefin polymers is often desirable. Preferably, the substituent is derived from a polyolefin characterized by a Mn value of about 700 to about 10,000 and a Mw/Mn value of 1.0 to about 4.0.

In one method for preparing the hydrocarbon substituted acylating agents employed to prepare the compositions used in this invention, one or more of the above-described polyalkenes is reacted with one or more olefinic carboxylic acid reactants. Representative acids include maleic or fumaric reactants, such as acids or anhydrides, acrylic acid, itaconic acid, etc. Ordinarily the reactants will be the acid, the anhydride, or a mixture of two or more of these. The maleic reactants are usually preferred, and result in substituted succinic acid-producing compounds.

For convenience and brevity, the term "acidic reactant" is often used hereinafter. When used, it should be understood that the term is generic to olefinic carboxylic acid reactant. Also, the term "acylating agents" is used herein to represent the substituted acylating compounds.

One procedure for preparing the acylating agents used in this invention is illustrated, in part, in U.S. Pat. No. 3,219,666 which is expressly incorporated herein by reference for its teaching in regard to preparing acylating agents. This procedure, conveniently designated as "the two-step procedure", involves first chlorinating the olefin, olefin oligomers or olefin polymers described hereinabove until there is an average of at least about one chloro group for each molecular weight of olefinic compound. If a diluent is used in the chlorination procedure, it should be one which is not itself readily subject to further chlorination.

The second step in the two-step procedure is to react the chlorinated olefinic material with the acidic reactant. The mole ratio of chlorinated olefinic material to acidic reactant is usually about 1:1; however, a stoichiometric excess of acidic reactant can be used. If an average of more than about one chloro group per molecule of olefinic material is introduced during the chlorination step, then more than one mole of acidic reactant can react per molecule of chlorinated olefinic material. It is normally desirable to provide an excess of acidic reactants. Unreacted excess acidic reactant may be stripped from the reaction product, or reacted during a further stage as explained below. The resulting aliphatic hydrocarbon substituted acylating agent may be, optionally, again chlorinated if the desired number of succinic groups are not present in the product. Any excess acidic reactant remaining form the second step will react as additional chlorine is introduced during the subsequent chlorination. Additional acidic reactant may be introduced during and/or subsequent to the additional chlorination step. This technique may be repeated until the total number of acylating groups per equivalent weight of substituent groups reaches the desired level.

A procedure for preparing substituted succinic acylating agents utilizes a process described in U.S. Pat. No. 3,912,764 and U.K. Patent 1,440,219, both of which are expressly incorporated herein by reference for their teachings in regard to that process. According to that process, a polyalkene and a maleic reactant are first reacted by heating them together in a "direct alkylation" procedure. When the direct alkylation step is completed, chlorine is introduced into the reaction mixture to promote reaction of the remaining reactants.

Another process for preparing substituted succinic acylating agents is the so-called "one-step" process. This process is described in U.S. Pat. Nos. 3,215,707 and 3,231,587. Both are expressly incorporated herein by reference for their teachings in regard to that process. Basically, the one-step process involves preparing a mixture of the olefinic material and the acidic reactant containing the necessary amounts of both to provide the desired substituted acylating agents. Chlorine is then introduced into the mixture, while maintaining a temperature of at least about 140° C. A variation of this process involves adding additional acidic reactants during or subsequent to the chlorine introduction.

Usually, where the olefinic material is sufficiently fluid under mixing and reaction conditions, there is no need to utilize a solvent/diluent in the one-step process. However, as explained hereinbefore, if a solvent/diluent is employed it is preferably one that resists chlorination.

In addition to the disclosures contained in the publications and patents listed hereinabove, aliphatic hydrocarbon substituted acylating agents are described in the listings of patents and other publications describing borated and nonborated acylated nitrogen compound. Furthermore, descriptions of many useful types of acylating agents are provided in Canadian Patent 1,183,125 and PCT Publication WO 85/03504 and in the following U.S. Pat. No. :

| | | |
|---|---|---|
| 2,962,443 | 4,061,474 | 4,203,855 |
| 3,172,892 | 4,067,698 | 4,205,960 |
| 3,341,542 | 4,090,971 | 4,216,099 |
| 3,374,174 | 4,098,708 | 4,234,435 |
| 3,444,170 | 4,110,349 | 4,285,824 |
| 3,454,607 | 4,128,488 | 4,320,019 |
| 3,502,677 | 4,131,554 | 4,343,740 |
| 3,755,169 | 4,163,730 | 4,357,250 |
| 3,787,374 | 4,176,077 | 4,471,091 |
| 3,859,318 | 4,179,449 | 4,486,573 |
| 3,868,330 | 4,186,139 | 4,489,194 |

Each of the above referred to and/or listed patents and publications is hereby expressly incorporated by reference for teachings contained therein regarding hydrocarbon substituted acylating agents.

The amines which are used to prepare the nitrogen containing compositions may be monoamines and polyamines. The monoamines and polyamines must be characterized by the presence within their structure of at least one H—N group. Therefore, they have at least one primary (i.e., $H_2N$—) or secondary (i.e., H—N=) amino group. The amines can be aliphatic, cycloaliphatic or heterocyclic, including aromatic substituted versions thereof. The amines may also contain non-hydrocarbon substituents or groups as long as these groups do not significantly interfere with the reaction of the amines with the acylating agents. Such non-hydrocarbon substituents have been described hereinabove.

In general the amine employed to prepare the acylated amine may be characterized by the formula $R_1R_2NH$ wherein $R_1$ and $R_2$ are each independently hydrogen or hydrocarbon, amino-substituted hydrocarbon, hydroxy-substituted hydrocarbon, alkoxy-substituted hydrocarbon, amino, carbamyl, thiocarbamyl, guanyl and acylimidoyl groups provided that only one of $R_1$ and $R_2$ may be hydrogen.

With the exception of the branched polyalkylene polyamine, the polyoxyalkylene polyamines, and the high molecular weight hydrocarbyl-substituted amines described more fully hereinafter, the amines ordinarily contain less than about 40 carbon atoms in total and usually not more than about 20 carbon atoms in total.

Aliphatic monoamines include mono-aliphatic and dialiphatic-substituted amines wherein the aliphatic groups can be saturated or unsaturated and straight or branched chain. Thus, they are primary or secondary aliphatic amines.

Cycloaliphatic monoamines are those monoamines wherein there is one cycloalliphatic substituent attached directly to the amino nitrogen through a carbon atom in the cyclic ring structure.

Suitable aromatic amines include those monoamines where a carbon atom of the aromatic ring structure is attached directly to a carbon atom of an aliphatic hydrocarbon chain. The aromatic ring will usually be a mononuclear aromatic ring but can include fused aromatic rings especially those derived from naphthalene.

Specific examples of the above-described amines are given in U.S. Pat. No. 4,234,435 which is expressly incorporated by reference for its disclosure regarding such amines.

The polyamines from which the acylated amine is derived include principally alkylene amines conforming for the most part to the formula

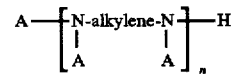

wherein n is an integer preferably less than about 10, A is hydrogen or a substantially hydrocarbon group preferably having up to about 30 carbon atoms, and the alkylene group is preferably a lower alkylene group having less than about 8 carbon atoms. Illustrative examples of such amines are given in the above-mentioned U.S. Pat. No. 4,234,435. Higher homologs such as are obtained by condensing two or more alkylene amines likewise are useful. They are described in some detail under the heading "Ethylene Amines" in "Encyclopedia of Chemical Technology", Kirk and Othmer, Volume 5, Pages 898–905, Interscience Publishers, New York (1950). This article is hereby incorporated herein by reference. Such compounds are prepared most conveniently by the reaction of an alkylene chloride with ammonia. The reaction results in the production of somewhat complex mixtures of alkylene amines, including cyclic condensation products, such as piperazines. These mixtures as well as pure alkylene amines are useful in the preparation of acylated amines. An especially useful alkylene amine is a mixture of ethylene amines prepared by the reaction of ethylene chloride and ammonia and having a composition which corresponds to that of tetraetylene pentamine.

Hydroxyalkyl-substituted alkylene amines i.e., alkylene amines having one or more hydroxyalkyl substituents on the nitrogen atoms, likewise are contemplated for use herein. They hydroxyalkyl-substituted alkylene amines are preferably those in which the alkyl group is a lower alkyl group. Higher homologs are obtained by condensation of the above-illustrated alkylene amines or hydroxyalkyl-substituted alkylene amines through amino radicals or through hydroxy radicals are likewise useful.

Heterocyclic mono- and polyamines can also be used in making the boron and nitrogen-containing compositions. As used herein, the terminology "heterocyclic mono- and polyamines" is intended to describe those heterocyclic amines containing at least one primary or secondary amino group at any position in the molecule and at least one nitrogen as a heteroatom in the heterocyclic ring. Heterocyclic amines can be saturated or unsaturated and contain various substituents. Generally the total number of carbon atoms in the substituents will not exceed about 20. Heterocyclic amines can contain heteroatoms other than nitrogen, especially oxygen and sulfur, and can contain more than one nitrogen heteroatom. The five- and six-membered heterocyclic rings are preferred.

An extensive listing of specific examples of the various types of amines is presented in U.S. Pat. Nos. 5,230,714 and 4,234,435 which is herein expressly incorporated by reference for relevant disclosures contained therein.

The boron-containing reagent is any boron-containing compound which will react with the substituted acylating agent, the amine or with reaction products thereof. Useful boron compounds include boron oxide, boron oxide hydrate, boron trioxide, boron halides, boron acids such as boronic acid, boric acid, boron anhydrides, boron amides and various esters of such boron acids. The use of complexes of boron halides with ethers, organic acids and the like are also useful. Examples of the above-mentioned boron-containing reagents and other boron-containing reagents useful in preparation of borated acylated amines can be found in U.S. Pat. No. 3,254,205 which is hereby incorporated by reference for its disclosure of useful boron-containing reagents.

As mentioned hereinabove, the boron-containing acylated nitrogen compound may be prepared by reacting the carboxylic acylating agent, amino compound and boron-containing reagent simultaneously or sequentially, in any order. For example, the boron-containing reagent may be first mixed with the acylating agent to which combination may be added the amino compound. Alternatively, the boron-containing reagent may be combined with the amino compound forming an intermediate product which can then be reacted with the acylating agent. A preferred method is to first form a reaction product from the acylating agent and the amine followed by post-treatment thereof with the boron-containing reagent. U.S. Pat. Nos. 3,254,025; 3,000,916; 3,087,936; 3,281,428; 3,282,955; 3,344,069; 3,449,362; 3,666,662; 4,428,849 and 4,234,435 which are herein expressly incorporated by reference, discussed procedures for preparing oil-soluble nitrogen and boron-containing materials. The general teachings of these referenced patents may be modified as noted hereinabove.

Reactions to prepare components borated acylated nitrogen compounds result in products containing boron and substantially all of the nitrogen originally present in the nitrogen reactant. The nature of the product is not clearly understood. Inasmuch as the precise stoichiometry of the complex formation is not known. The relative proportions of the reactants to be used in the process are based primarily upon the consideration of utility of the products for the purpose of this invention. In this regard, useful products are obtained from reaction mixtures in which the reactants are present in relative proportions as to provide from about 0.01 atomic proportions of boron for each mole of nitrogen to about 10 atomic proportions of boron for each atomic proportion of nitrogen. The preferred amounts of reactants are such as to provide from about 0.5 to about 2 atomic proportions of boron for each atomic proportion of nitrogen.

It is emphasized that the acylated nitrogen compound will have a total base number up to about 150 and preferably from about 80 to about 120 on an oil free basis. The aliphatic hydrocarbon substituent has at least about 10 carbon atoms, preferably at least about 30 carbon atoms, more preferably at least about 50 carbon atoms. Often the number of carbon atoms in the hydrocarbon substituent in a particular additive will vary over some range such as from 10 to 100, 20 to 70, and the like. In such cases, the carbon numbers referred to hereinabove, i.e., at least about 10.

In general terms, the nitrogen-containing compounds may be prepared by reacting one or more of the aliphatic hydrocarbon-substituted carboxylic acylating agents with one or more of the amines which have been described hereinabove, optionally in the presence of a normally liquid, substantially inert organic liquid solvent/diluent at an elevated temperature generally in the range from about 80° C. up to the decomposition point of the mixture or the product. Normally, temperatures in the range of about 100° C. up to about 300° C. are utilized providing that 300° C. does not exceed the decomposition point.

The aliphatic hydrocarbon-substituted carboxylic acylating agent and the amino compound are reacted in amounts sufficient to provide at least one-half equivalent, per equivalent of acylating agent of the amino compound. Generally, the maximum amount of amine present will be about 2 moles of amine per equivalent of acylating agent. For the purposes of this invention, sufficient amine is present to provide a resulting product having a total base number up to about 80.

The following are illustrative nonlimiting examples of the process for preparing the nitrogen- and boron-containing compounds and nitrogen-containing compositions useful in this invention.

EXAMPLE I

A polyisobutenyl succinic anhydride is prepared by the reaction of a chlorinated polyisobutylene with maleic anhydride at 200° C. The polyisobutenyl group has an average molecular weight of 850 and the resulting alkenyl succinic anhydride is found to have an acid number of 113 (corresponding to an equivalent weight of 500). To a mixture of 500 grams (1 equivalent) of this polyisobutenyl succinic anhydride and 160 grams of toluene there is added at room temperature 35 grams (1 equivalent) of diethylene triamine. The addition is made portionwise throughout a period of 15 minutes, and an initial exothermic reaction causes the temperature to rise to 50° C. The mixture then is heated and a water-toluene azeotrope distilled from the mixture. When no more water distills, the mixture is healer to 150° C. at reduced pressure to remove the toluene. The residue is diluted with 350 grams of mineral oil and this solution is found to have a nitrogen content of 1.6%.

EXAMPLE II

A mixture of 1000 parts (0.495 mole) of polyisobutene (Mn=2020, Mw=6049) and 115 parts (1.17 moles) of maleic anhydride is heated to 110° C. This mixture is heated to 184° C. in 6 hours during which 85 parts (1.2 moles) of gaseous chlorine is added beneath the surface. AT 184° C.–189° C., an additional 59 parts (0.83 mole) of chlorine is added beneath the surface. At 184° C.–189° C., an additional 59 parts (0.83 mole) of chlorine is added over 4 hours. The reaction mixture is stripped by heating at 186° C.–190° C. with nitrogen blowing for 26 hours. The residue is the desired polyisobutene-substituted succinic acylating agent having a saponification equivalent number of 87 as determined by ASTM procedure D-94.

A mixture is prepared by the addition of 57 parts (1.38 equivalents) of a commercial mixture of ethylene polyamines having from about 3 to 10 nitrogen atoms per molecule to 1067 parts of mineral oil and 893 parts (1.38 equivalents) of the substituted succinic acylating agent at 140° C.–145° C. The reaction mixture is heated to 155° C. in 3 hours and stripped by blowing with nitrogen. The reaction mixture is filtered to yield the desired product.

EXAMPLE III

To 1000 parts of poly(isobutene) substituted succinic anhydride (which is prepared by the "one-step" procedure of U.S. Pat. No. 3,215,707) having a saponification number of 108 is added 147 parts of an ethylene polyamine having an empirical formula that corresponds to pentaethylene hexamine, and 275 parts mineral oil. The reaction is begun at 90° C. and the temperature is increased to 121° C. with nitrogen blowing. The reaction mixture is stripped of volatile materials by heating to 150° C. The residue is filtered.

A slurry of 239 parts boric acid in 398 parts mineral oil is reacted with 1405 parts of the product of EXAMPLE III. The reaction is conducted starting at 90° C. and the temperature is increased to 150° C. over 3 hours followed by nitrogen blowing at 150° C.–155° C. The reaction mixture is filtered.

In the claims below, all additives to the oil of lubricating viscosity are given on an oil free basis. It is normal practice to supply additives mixed in oil, but in the interest of clarity and conciseness, when used in the claims, the additives weights are oil free and thus their weight percents in the composition are oil free.

What is claimed is:

1. A shear stable multipurpose fluid composition for use as a lubricating or functional fluid, said composition comprising:
   A. An oil of lubricating viscosity; said oil having a viscosity of 1–10 centistoke (cSt) at 100° C.;
   B. 1–15% by weight of a metal salt of an organic acid;
   C. 0.05–5% by weight of a metal, said metal being the metal in said metal salt;
   D. 1–25% by weight of a shear stable viscosity modifier; wherein said composition has a Brookfield viscosity of under 20,000 cP at –40° C., and exhibits a viscosity loss of less than 20% at 100° C. when measured after a 20 hour Tapered Bearing Shear Test.

2. A composition according to claim 1, wherein said viscosity modifier has $\overline{\text{Mn}}$ 500–3,000.

3. A composition according to claim 2, wherein said viscosity modifier has a kinematic viscosity of 200–4,400 cSt at 100° C.

4. A composition according to claim 1, wherein said composition exhibits a viscosity loss of under 10% at 100° C.

5. A composition according to claim 1, wherein said viscosity modifier is a polyolefin.

6. A composition according to claim 1, wherein said oil comprises mineral, vegetable or synthetic oil or mixtures thereof.

7. A composition according to claim 6, wherein said synthetic oil comprises at least 50% of said oil.

8. A composition according to claim 7, wherein said synthetic oil is a hydrogenated poly-alpha-olefin.

9. A composition according to claim 7, wherein said synthetic oil comprises a hydrogenated poly-alpha-olefin and at least one other synthetic oil.

10. A composition according to claim 9, wherein said other synthetic oil is a diester.

11. A composition according to claim 1, wherein said metal salt is a sulphonate, carboxylate, phenate, salicylate, or equivalent or mixtures thereof.

12. A composition according to claim 1, wherein said metal salt is an overbased sulphonate.

13. A composition according to claim 12, wherein said metal salt is an alkyl aryl sulphonate.

14. A composition according to claim 1, wherein said metal of said metal salt is selected from the group consisting of lithium, potassium, sodium, magnesium, barium and calcium and mixtures thereof.

15. A composition according to claim 14, wherein said metal is magnesium or calcium or mixtures thereof.

16. A composition according to claim 1, said composition further comprising 0.5–10% by weight of a metal dialkyl dithiophosphate.

17. A composition according to claim 16, wherein said metal included in said dialkyl dithiophosphate is selected from the group consisting of sodium, potassium, copper, magnesium, calcium, barium and zinc.

18. A composition according to claim 17, wherein the dialkyl groups are the same or different and are selected from alkyl groups having 3 to 16 carbon atoms.

19. A composition according to claim 18, wherein said metal dialkyl dithiophosphate is zinc di-isooctyl dithiophosphate.

20. A composition according to claim 1, said composition further comprising 0.5–10% by weight of a friction modifier.

21. A composition according to claim 20, wherein said friction modifier is selected from the group consisting of sulfurized olefins, sulfurized fats, sulfurized fatty acids, fatty amides, alkoxylated fatty amines, borated fatty epoxides, fatty phosphites, fatty epoxides, borated alkoxylated fatty amines, metal salts of fatty acids, borated fats, fatty imidazolenes and mixtures thereof.

22. A composition according to claim 20, wherein said friction modifier comprises a sulfurized mixture of olefins, fats and fatty acids.

23. A composition according to claim 1, wherein said composition further comprises 0.5–5% by weight of a 6–24 carbon atom fatty amide.

24. A composition according to claim 1, said composition further comprising 0.5–10% by weight dialkyl phosphite.

25. A composition according to claim 24, wherein said alkyl groups are the same or different.

26. A composition according to claim 24, wherein said alkyl groups comprise 8–28 carbon atoms and mixtures thereof.

27. A composition according to claim 23, wherein said phosphite is dioleyl phosphite.

28. The composition according to claim 1, wherein said composition further comprises 0.1–5% of the reaction products of a carboxylic acylating agent and an amine.

29. A fluid as recited in claim 28, wherein said amine is a polyamine selected from the group consisting of (a) a product made by contacting a hydroxy material with an amine; (b) an alkylene polyamine; (c) a product made by contacting a hydroxy material with an alkylene polyamine and mixtures thereof.

30. A composition as recited in claim 29, wherein said carboxylic acylating agent is a succinic acylating agent.

31. A composition as recited in claim 30, wherein said succinic acylating agents is a substituted succinic acylating agent.

32. A composition as recited in claim 31, wherein said succinic acylating agent is the reaction product of polybutene and maleic acid or maleic anhydride.

33. A composition as recited in claim 28, wherein said fluid further comprises products from the reaction of carbon disulfide with said reaction products of claim 28.

34. A shear stable composition for use as a lubricant and function fluid, said composition comprising:

A. A majority of an oil of lubricating viscosity said oil having a viscosity of 1–10 centistoke (cSt) at 100° C.;

B. 1–15% by weight of a metal salt of an organic acid;

C. 0.5–10% by weight of a metal dialkyl dithiophosphate;

D. 0.5–10% by weight of a sulfurized mixture of olefins, fats and fatty acids;

E. 0.05–3% by weight of a fatty amide;

F. 0.5–10% by weight of dialkyl phosphite; and

G. 1–25% by weight of a shear stable viscosity modifier; wherein said composition has a Brookfield Viscosity of less than 20,000 cP at −40° C. and a viscosity loss of less than 20% at 100° C. where determined after a 20 hour Tapered Bearing Shear Test.

35. A composition according to claim 34, wherein said viscosity modifier has $\overline{Mn}$ of 500–3,000 and a kinematic viscosity of 200–4,400 cSt at 100° C.

36. A composition according to claim 34, wherein said metal salt is an overbased metal salt.

37. A composition according to claim 34, wherein the metal of said metal salt comprises 0.05–5% by weight of said composition.

38. A composition according to claim 34, wherein said metal salt is a sulphonate, carboxylate, phenate, salicylate, or equivalent or mixtures thereof.

39. A composition according to claim 34, wherein said metal salt is an alkyl aryl sulphonate.

40. A composition according to claim 37, wherein said metal of said metal salt is selected from the group consisting of lithium, potassium, sodium, magnesium, barium and calcium.

41. A composition according to claim 40, wherein said metal is magnesium or calcium or mixtures thereof.

42. A composition according to claim 34, wherein said metal include in said dialkyl dithiophosphate is selected from the group consisting of sodium, potassium, copper, magnesium, calcium, barium and zinc.

43. A composition according to claim 42, wherein the dialkyl groups are the same or different and are selected from alkyl groups having 3 to 16 carbon atoms.

44. A composition according to claim 43, wherein said metal dialkyl dithiophosphate is zinc di-isooctyl dithiophosphate.

45. A composition according to claim 34, wherein said sulfurized mixture comprises sulfurized soybean oil, tall oil and an olefins having 8–36 carbon atoms.

46. A composition according to claim 34, wherein said dialkyl phosphite comprises alkyl groups which are either the same or different.

47. A composition according to claim 46, wherein said alkyl groups comprise 8–28 carbons, and mixtures thereof.

48. A composition according to claim 34, wherein said phosphite is dioleyl phosphite.

49. A composition according to claim 34, wherein said oil comprises mineral, vegetable or synthetic oils and mixtures thereof.

50. A composition according to claim 49, wherein said synthetic oil comprises at least 50% of said oil.

51. A composition according to claim 49, wherein said synthetic oil comprises a hydrogenated poly-alpha-olefin.

52. A composition according to claim 49, wherein said synthetic oil comprises a hydrogenated poly-alpha-olefin and at least one other synthetic oil.

53. A composition according to claim 52, wherein said other synthetic oil is a diester.

54. A composition according to claim 49, wherein said synthetic oil has a viscosity of about 1–8 cSt.

55. A composition according to claim 34, wherein said oil of lubricating viscosity comprises synthetic oils or mixtures thereof.

56. The composition according to claim 34, wherein said composition further comprises 0.1–5% of the reaction products of a carboxylic acylating agent and an amine.

57. A fluid as recited in claim 56, wherein said amine is a polyamine selected from the group consisting of (a) a product made by contacting a hydroxy material with an amine; (b) an alkylene polyamine; (c) a product made by contacting a hydroxy material with an alkylene polyamine and mixtures thereof.

58. A composition as recited in claim 57, wherein said carboxylic acylating agent is a succinic acylating agent.

59. A composition as recited in claim 58, wherein said succinic acylating agents is a substituted succinic acylating agent.

60. A composition as recited in claim 59, wherein said succinic acylating agent is the reaction product of polybutene and maleic acid or maleic anhydride.

61. A composition as recited in claim 56, wherein said fluid further comprises products from the reaction of carbon disulfide with said reaction products of claim 56.

\* \* \* \* \*